(12) United States Patent
Chiu et al.

(10) Patent No.: US 7,629,962 B2
(45) Date of Patent: Dec. 8, 2009

(54) IMAGE CAPTURING DEVICE

(75) Inventors: Ho-Feng Chiu, Taipei Hsien (TW); Cheng-Chung Kuo, Taipei (TW); Jen-Chun Weng, Taipei (TW)

(73) Assignee: Lite-On Technology Corp., Taipei (TW)

( * ) Notice: Subject to any disclaimer, the term of this patent is extended or adjusted under 35 U.S.C. 154(b) by 617 days.

(21) Appl. No.: 11/307,068

(22) Filed: Jan. 22, 2006

(65) Prior Publication Data

US 2007/0008285 A1 Jan. 11, 2007

(30) Foreign Application Priority Data

Jun. 17, 2005 (TW) .............................. 094120228 A

(51) Int. Cl.
*G09G 5/08* (2006.01)
(52) U.S. Cl. ..................... 345/166; 345/156; 382/124
(58) Field of Classification Search .................. 345/63, 345/156–167; 382/124; 356/237.2; 385/88
See application file for complete search history.

(56) References Cited

U.S. PATENT DOCUMENTS 6,501,460 B1 * 12/2002 Paik et al. ................... 345/163
7,148,078 B2 * 12/2006 Moyer et al. .................. 438/65
2003/0034959 A1 * 2/2003 Davis et al. .................. 345/166
2003/0201951 A1 * 10/2003 Chin ............................ 345/63
2004/0208348 A1 * 10/2004 Baharav et al. ............. 382/124
2004/0239919 A1 * 12/2004 Schwarz .................. 356/237.2
2005/0100288 A1 * 5/2005 Chu ............................ 385/88

FOREIGN PATENT DOCUMENTS

| CN | 1349195 A | 5/2002 |
| CN | 1404006 A | 3/2003 |
| CN | 1503369 A | 6/2004 |
| TW | 577604 | 2/2004 |
| TW | M260787 | 4/2005 |

* cited by examiner

*Primary Examiner*—Amare Mengistu
*Assistant Examiner*—Premal Patel
(74) *Attorney, Agent, or Firm*—Rosenberg, Klein & Lee

(57) ABSTRACT

An image capturing device is disclosed. The image capturing device includes: a light-emitting component for generating a light ray; a light-guiding component for providing a first straight light-guiding path to guide the light ray generated by the light-emitting component toward a surface; and a sensor for sensing the light ray reflected by the surface to detect a movement of the image capturing device on the surface.

11 Claims, 4 Drawing Sheets

IMAGE CAPTURING DEVICE

BACKGROUND OF THE INVENTION

1. Field of the Invention

The present invention relates to an image capturing device, and more specifically, to an image capturing device capable of providing straight light-guiding paths and comprising a light-guiding component that is composed of opaque material(s).

2. Description of the Prior Art

Image capturing technologies are popularly applied to several kinds of electronic devices, such as an optical mouse, or a fingerprint recognition device. An optical mouse according to a prior art is herein taken as an example. The operation of the optical mouse is described as follows. In general, a light-emitting component of the optical mouse emits a light ray that will arrive at a surface of an object (i.e., a surface of a desk or a mouse pad). Next, a sensor of the optical mouse senses the light ray reflected by the surface to generate a corresponding image. In this way, when the optical mouse moves on the surface, the optical mouse can capture a plurality of images using image recognition technologies, and then compute a displacement vector between the optical mouse and the surface. Finally, the optical mouse can generate a pointing signal corresponding to the displacement vector and send the pointing signal to a host (i.e., a computer).

Please refer to FIG. 1. FIG. 1 is a cross-sectional diagram of an optical mouse 10 according to the prior art. The optical mouse 10 comprises a light-emitting component 12, a support 14, a transparent component 16, a lens 18, a mold 22, a sensor 24, a conducting support 26, a diaphragm 28, and a printed circuit board (PCB) 30. A lighting system according to the prior art is composed of the light-emitting component 12, the support 14 and the transparent component 16. An image formation system according to the prior art is composed of the lens 18 (installed in the transparent component 16), the mold 22, the sensor 24, the conducting support 26 and the diaphragm 28. For the lighting system, the light-emitting component 12 is a light emitting diode (LED) for emitting a light ray L1' toward a surface 31 of an object. The support 14 is utilized for fixing the light-emitting component 12. The light ray L1' emitted by the light-emitting component 12 is guided toward an image formation area of the surface 31 with an appropriate angle by the transparent component 16 through reflection and refraction, wherein the light ray L1' is usually obliquely guided toward the image formation area of the surface 31.

For the image formation system, the conducting support 26 is utilized for fixing the sensor 24 and for supplying power to the sensor 24. The mold 22 is generated by an injection-molding process, where the material of the mold 22 is black plastic. The mold 22 is a container for protecting the sensor 24, and comprises a lower cover. The lower cover has a hole so that it can be utilized as a diaphragm 28. The diaphragm 28 is utilized for filtering out undesired light rays, in order to improve the quality of the optical image formation. In addition, the lens 18 is utilized for collecting and transmitting the reflective light rays on the surface 31 to the sensor 24. The PCB 30 transmits the plurality of images sensed by the sensor 24 and outputs the images to a control component (not shown in FIG. 1). The control component then generates a pointing signal according to the images. The PCB 30 can supply power to the sensor 24 and the light-emitting component 12, and can be connected to the conducting support 26 and the support 14 to assist in fixing the sensor 24 and the light-emitting component 12.

The optical mouse 10 has the following disadvantages, however:

(1) Through the transparent component 16, the angle of the light ray L1' emitted by the light-emitting component 12 is changed and arrives obliquely at the surface 31, i.e. the light ray L1' is not detected evenly at the surface.

(2) The light ray L1' emitted by the light-emitting component 12 passes through air and then enters the transparent component 16. Next, after two total reflections and passing through the transparent component 16 once more, the light ray L1' passes through air again and then arrives at the surface 31. According to the prior art, utilizing the lens 18, the light ray reflected by the surface 31 can be formed as an image on the sensor 24. That is, the reflected light ray passes through air, enters the lens 18, leaves the lens 18 and then goes into air again. Next, the reflected light ray enters a layer of a transparent silica gel on the sensor 24 (for protecting the sensor 24), and then arrives at the sensor 24. Therefore, the intensity of the light ray decreases each time when the light passes through an interface formed by different mediums, causing the direction of the light ray to become disordered.

(3) The transparent component 16 is utilized for transmitting the light ray that arrives at the surface 31 and for transmitting another light ray reflected by the surface 31 to the sensor 24. By this method, the effect of filtering out the noises is not good.

(4) The transparent component 16 is a light-pervious component. Several light rays L1' and L2' arriving at the surface 31 rather than the image formation area of the surface 31 will arrive at the sensor 24, causing unnecessary interference resulting in a situation in which the images sensed by the sensor 24 are blurred.

(5) The lens 18 can collect the reflected light rays from the image formation area of the surface 31 and transmit them to the sensor 24. The light illumination area is large, however, so many scattered light rays not from the image formation area may enter the sensor 24 through the transparent component 16, resulting in a situation in which the images sensed by the sensor 24 are blurred.

SUMMARY OF THE INVENTION

One of the objectives of the claimed invention is therefore to provide an image capturing device capable of reducing the loss of light and further capable of decreasing noises, in order to solve the above-mentioned problem.

According to the claimed invention, an image capturing device is disclosed. The image capturing device comprises: a light-emitting component for generating a light ray; a light-guiding component for providing a first straight light-guiding path to guide the light ray generated by the light-emitting component toward a surface; and a sensor for sensing the light ray reflected by the surface to detect a movement of the image capturing device on the surface.

One of the major advantages and improvements is that a placement angle of a light-emitting component is adjusted so that a light ray can be directly guided towards a surface of an object, and then re-directed towards a sensor. In this way, repeated reflection and refraction can be avoided, and the light does not need to pass through many interfaces of different mediums, so the intensity of the light ray will not be weakened. A further advantage is that a light-guiding component is utilized for absorbing an undesired light ray (a noise). Hence, a better quality of an image formation of the sensor can be obtained, and thus the performance of the optical mouse can be improved.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
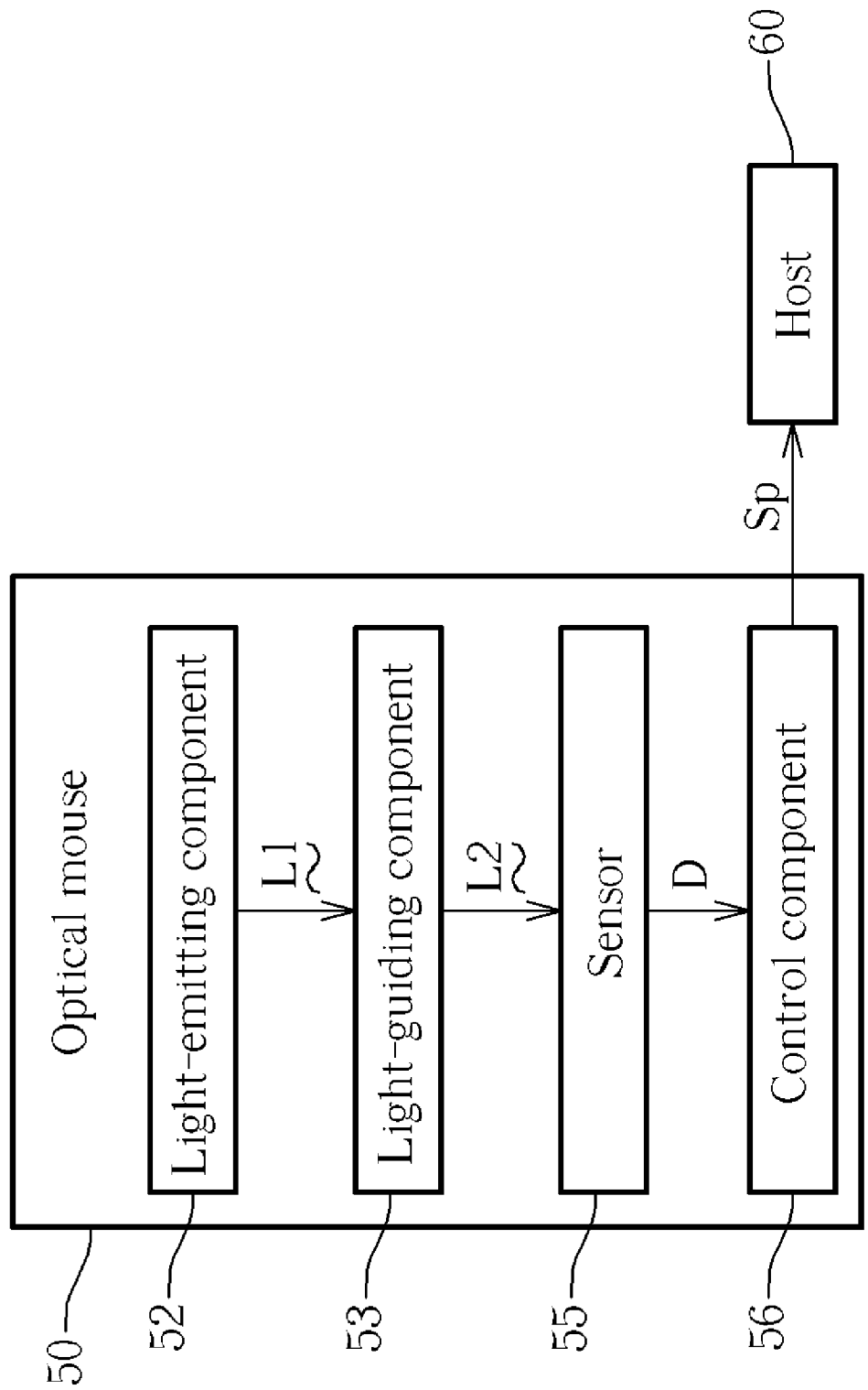
FIG. 2 is a functional block diagram of an optical mouse according to the present invention.

Please refer to FIG. 2. FIG. 2 is a functional block diagram of an optical mouse 50 according to the present invention. Please note that an optical pointing device (i.e. an optical mouse) is taken as an example to describe the technical characteristics of the present invention; however, the present invention is not limited to be applied to an optical pointing device. The present invention can be applied to any device with an image capturing mechanism, such as a fingerprint recognition device or other types of image recognition devices. As shown in FIG. 2, the optical mouse 50 is coupled to a host 60 (i.e., a computer). In the present embodiment, the optical mouse 50 comprises a light-emitting component 52, a light-guiding component 53, a sensor 55 (i.e., a CCD) and a control component 56. A light-emitting diode (LED) chip 61 in the light-emitting component 52 is utilized for emitting a light ray L1. The light-guiding component 53 defines a straight light-guiding path for guiding the light ray L1 toward a surface (i.e., a surface on which the optical mouse 50 lies). The light-guiding component 53 defines another straight light-guiding path for guiding a light ray L2 towards the sensor 55, wherein the light ray L2 is the light ray L1 reflected by the surface. Next, the sensor 55 can continuously detect the light rays L2 to generate a plurality of images D corresponding to the surface. Afterwards, the control component 56 determines a direction and a displacement of the movement of the optical mouse 50 according to the images D, and generates a corresponding pointing signal Sp to inform the host 60. It should be noted that in this embodiment of the present invention, the light ray L1 is emitted by the LED chip 61 of the light-emitting component 52, so the light rays L1, L2 are in the visible spectrum. However, in other embodiments of the present invention, the light-emitting device of the light-emitting component 52 is not limited to be the LED chip 61, and it can also be an infrared ray module or a laser diode. When these devices are utilized, the light rays L1, L2 are outside the visible spectrum. For example, if the light ray L1 is emitted by an infrared ray module of the light-emitting component 52, the light rays L1 and L2 are infrared rays (IR), which are invisible light. The description of the light-emitting component 52 will be detailed in the following paragraph.

Figure 3:
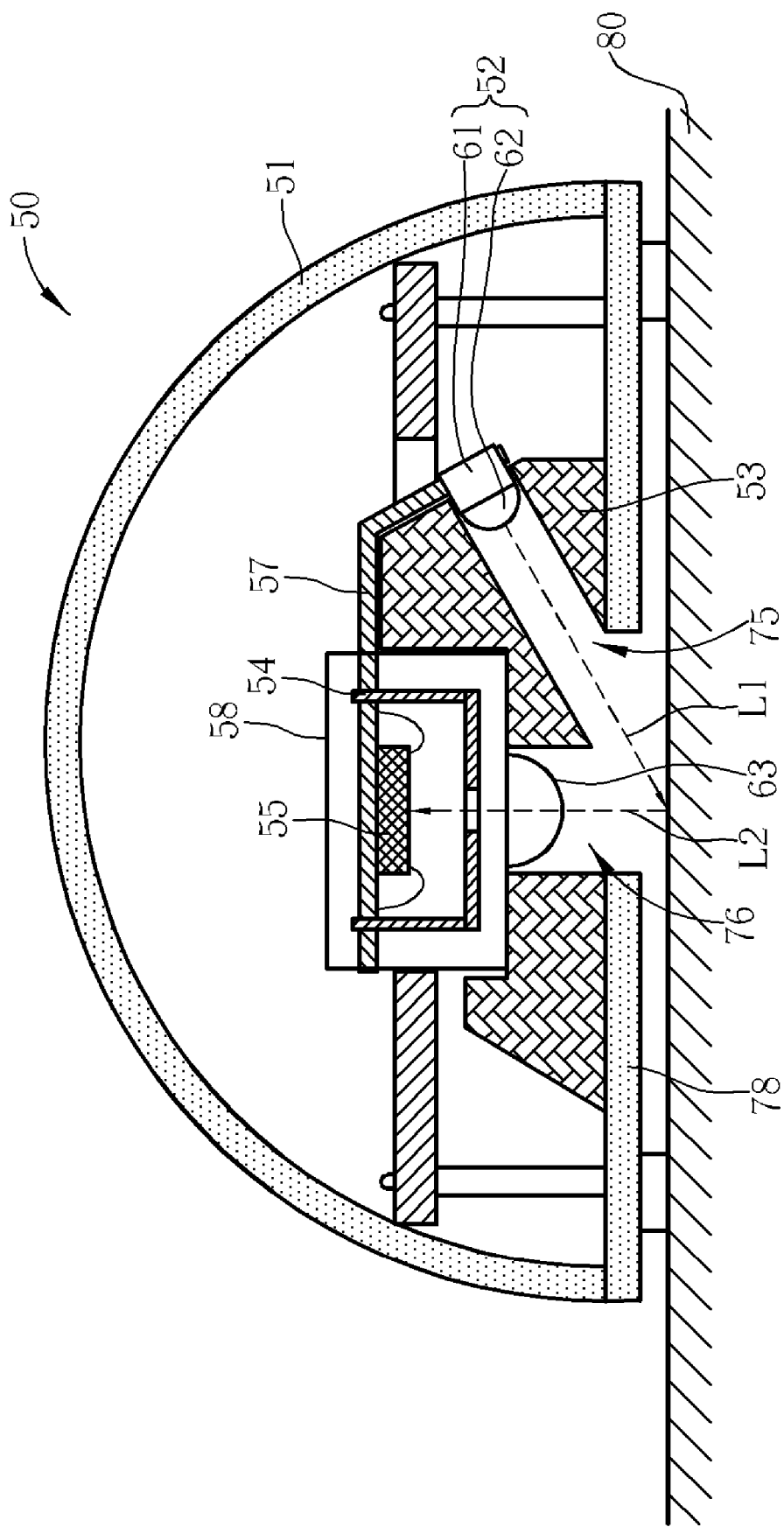
FIG. 3 is a cross-sectional diagram of the optical mouse shown in FIG. 2.

Please refer to FIG. 2 and FIG. 3. FIG. 3 is a cross-sectional diagram of the optical mouse 50 shown in FIG. 2. The optical mouse 50 on a surface 80 is utilized for detecting its own movement on the surface 80 and generating a pointing signal $S_p$ according to the movement. As shown in FIG. 3, the optical mouse 50 comprises the following components installed in the housing 51 of the optical mouse 50: the light-emitting component 52, the light-guiding component 53, a diaphragm 54, the sensor 55, a conducting support 57, a protecting component 58 and a lens 63. Please note that the operations and functions of the control component 56 are well known to those skilled in the art, and therefore the control component 56 is not shown in FIG. 3. This omission does not affect the present invention.

Figure 1:
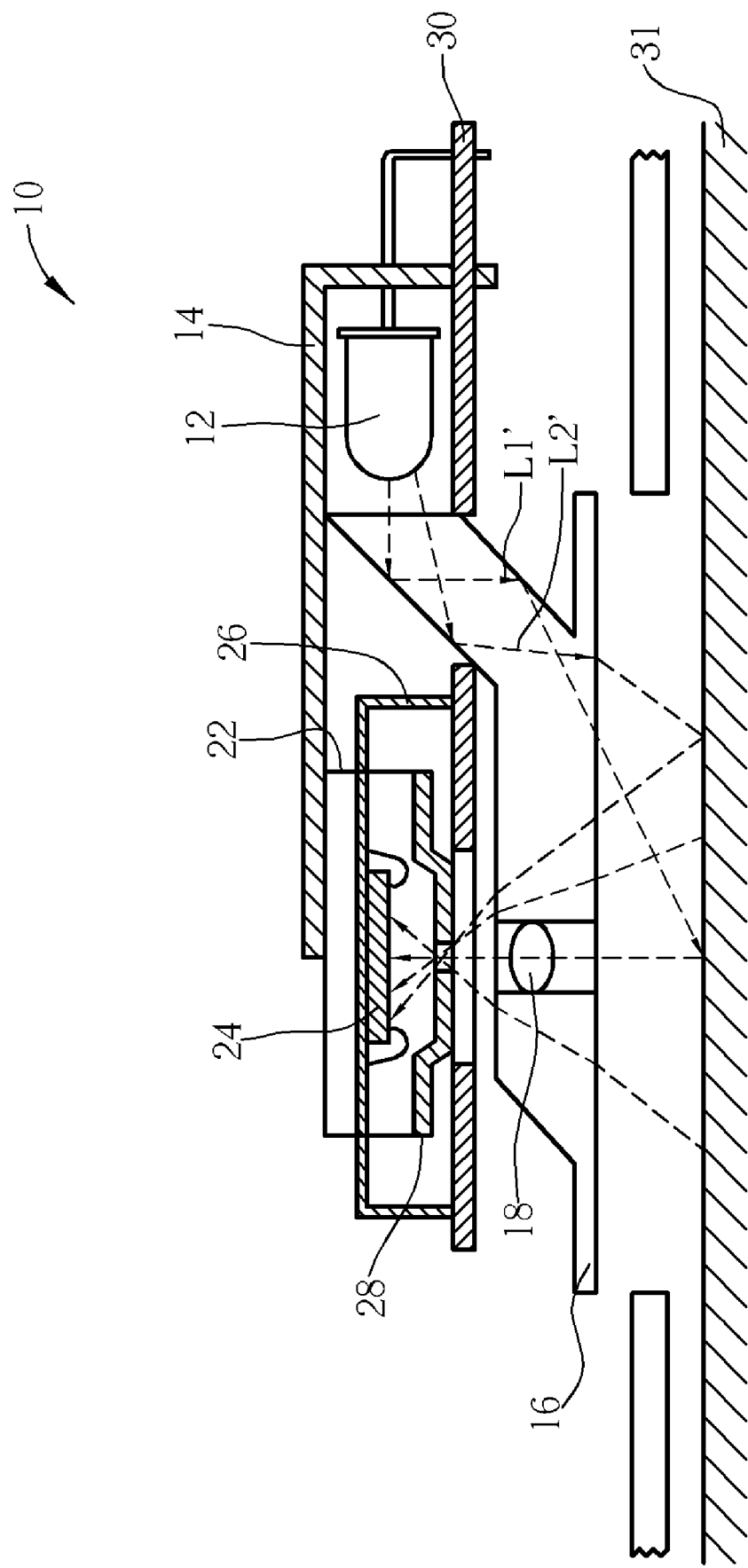
FIG. 1 is a cross-sectional diagram of an optical mouse according to a prior art.

The conducting support 57 is utilized for fixing the light-emitting component 52 and the sensor 55, and further for transmitting power to the light-emitting component 52 and the sensor 55. In addition, as shown in FIG. 3, the conducting support 57 is connected to the diaphragm 54 for fixing the diaphragm 54. The protecting component 58 is utilized for protecting the sensor 55 and the diaphragm 54, and for fixing the corresponding positions of the sensor 55 and the diaphragm 54. In this embodiment of the present invention, the light rays L1, L2 are in the visible spectrum, so the protecting component 58 is made of a transparent resin, meaning the transparent resin is utilized for sealing up and fixing the sensor 55 and the diaphragm 54. Moreover, the lens 63 is installed on one side of the protecting component 58 for adjusting the optical path of the light ray L2 that is to be guided towards the sensor 55. Please note that the lens 63 and the protecting component 58 can be individual components, meaning that the lens 63 is attached to the protecting component 58. However, the protecting component 58 and the lens 63 can be formed as a whole. For example, during a process of forming the protecting component 58 using the transparent resin, the lens 63 can be formed on one side of the protecting component 58. As shown in FIG. 1, the diaphragm 28 and the lens 18 of the optical mouse 10 according to the prior art cannot be integrated as a whole; however, the diaphragm 54 and the conducting support 57 of the optical mouse 50 according to the present invention can be integrated using a diaphragm component embedded technology. The protecting component 58 and the lens 63 formed as a whole are utilized for protecting and fixing the diaphragm 54 and the sensor 55. Therefore, according to the present invention, the protecting component 58 can be utilized for connecting the lens 63 and the diaphragm 54, so that before the light ray L2 arrives at the sensor 55, the number of times the light ray L2 passes through an interface (where each interface is formed by a different medium) can be reduced. Please note that in other embodiments of the present invention, if the light rays L1 and L2 are outside the visible spectrum (i.e., an infrared ray), the protecting component 58 is composed of opaque material(s), and the sensor 55 and the diaphragm 54 are positioned in the opaque material(s).

The light-emitting component 52 comprises a light emitting diode (LED) chip 61 and a lens 62, where the LED chip 61 is utilized for emitting a light ray L1. The lens 62 is installed on the LED chip 61 for adjusting an optical path of the light ray L1. For example, through utilizing the lens 62, light rays emitted by the LED chip 61 having different directions can be adjusted to be parallel with each other. As shown in FIG. 3, the light-guiding component 53 comprises a plurality of channels 75 and 76, respectively utilized for defining straight light-guiding paths. Therefore, the light ray L1 is guided by the straight light-guiding path defined by the channel 75 toward the surface 80 through a hole of the base 78. The light ray L2 reflected from the surface 80 is guided by the straight light-guiding path defined by the channel 76 toward the sensor 55. It should be noted that the placement angle of the light-emitting component 52 shown in FIG. 3 is different from that of the light-emitting component 12 in FIG. 1. Therefore, the light ray L1 emitted by the light-emitting component 52 can be directly guided toward the surface 80 through the straight light-guiding path. The other functions of the light-guiding component 53 will be detailed in the following paragraph.

The diaphragm 54, installed in the protecting component 58, is utilized for filtering the light ray guided toward the sensor 55. Hence, the desired light ray L2 can successfully pass through the diaphragm 54 and arrive at the sensor 55. The sensor 55 senses the light ray L2 to generate a plurality of images D corresponding to the surface 80. As mentioned above, the control component 56 (shown in FIG. 2) generates the pointing signal Sp according to the plurality of images.

As shown in FIG. 3, instead of passing through many interfaces formed by different mediums, the light ray L1 can be directly guided toward the surface 80. Hence, in contrast to the prior art, the intensity of the light ray L1 can be preserved as much as possible and the light uniformity received by the surface 80 can be improved. In addition, the light ray L2 only needs to pass through the lens 63, and then directly arrive at the sensor 55. Therefore, in contrast to the prior art, the number of times the light ray L2 passes through an interface becomes less. In conclusion, for the optical mouse 50 according to the present invention, a decrease in light intensity of the light rays L1 and L2 incurred by transmission processes is less comparing with the prior art, meaning that is less.

As mentioned above, the light-guiding component 53 is mainly utilized for defining the straight light-guiding paths. The light-guiding component 53 can be further utilized for assisting in fixing the protecting component 58, the light-emitting component 52 and the base 78 (a part of the housing 51). In the present embodiment, the light-emitting component 52 is installed in the channel 75, meaning that a goal of fixing the position of the light-emitting component 52 can be achieved using the channel 75. In addition, the channel 75 not only controls the angle of the light ray guided toward the surface 80 and the size of the light spot, but also absorbs light rays that are not parallel with the straight light-guiding paths. Therefore, the light rays L1 that can arrive at the image formation area of the surface 80 is more parallel to the straight light-guiding path corresponding to the channel 75. The functions of the channel 76 are listed as follows:

(1) Fixing the lens 63 in the channel 76 to achieve a goal of fixing the protecting component 58.

(2) Fixing the correlative positions of the base 78 and the sensor 55.

(3) Absorbing the light rays that are not parallel with the straight light-guiding path corresponding to the channel 76, and also absorbing the light rays (the noises) not reflected from the image formation area of the surface 80. For absorbing undesired light rays, the light-guiding component 53 according to the present invention is made of an opaque material, such as a black plastic material. In other words, the light-guiding component 53 can absorb many undesired light rays, only allowing the light rays that are more parallel with the straight light-guiding paths (the channels 75, 76) to pass through, such as the light rays L1, L2. In this way, the sensor 55 can obtain clear images to improve the performance of the optical mouse 50.

Figure 4:
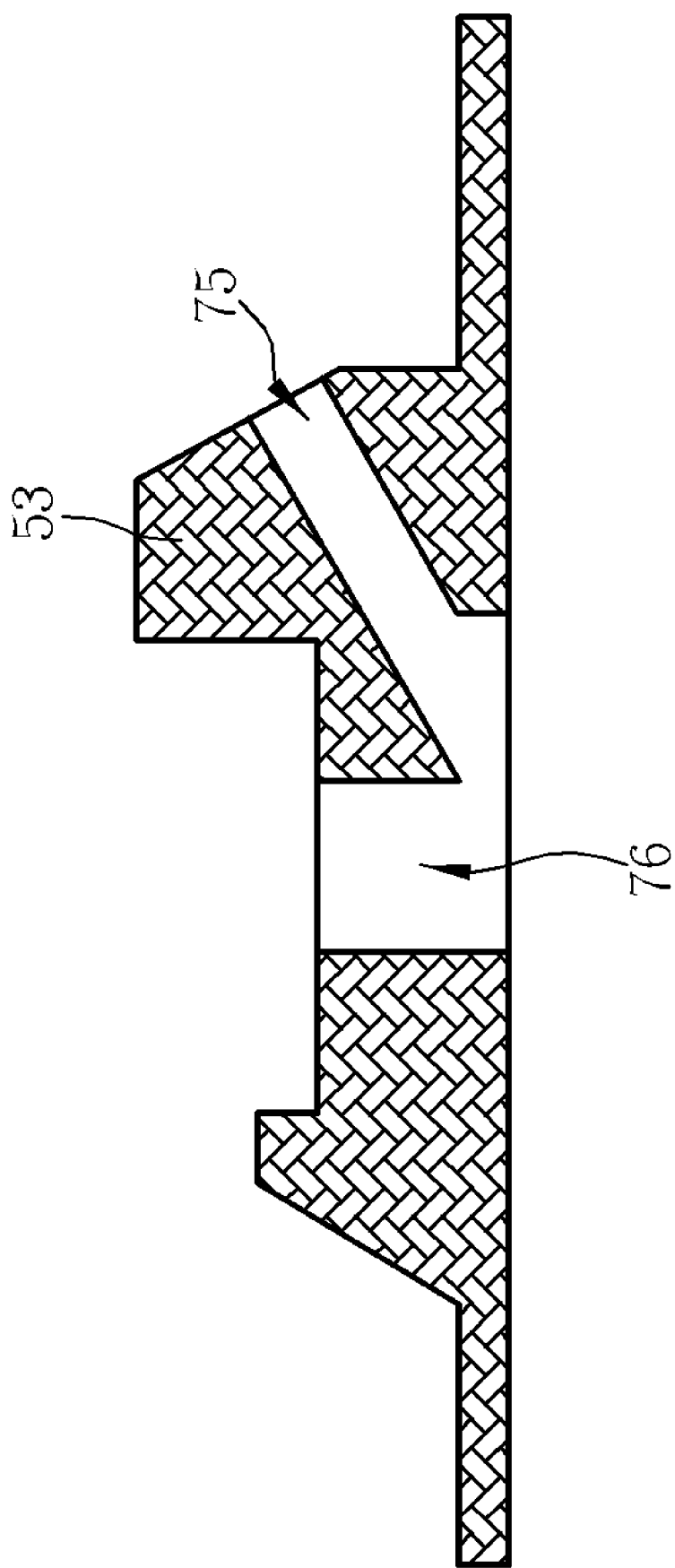
FIG. 4 is a cross-sectional diagram of another embodiment of the light-guiding component shown in FIG. 3.

As shown in FIG. 3, the light-guiding component 53 is installed on the base 78; however, the light-guiding component 53 and the base 78 also can be integrated into a single component. Please refer to FIG. 4. FIG. 4 is a cross-sectional diagram of another embodiment of the light-guiding component 53 shown in FIG. 3. The base 78 and the light-guiding component 53 shown in FIG. 3 are formed in an integrated manner; that is, the base of the housing 51 is designed to be the light-guiding component 53 and to comprise the channels 75 and 76. In other words, in the present embodiment, a flat surface of the light-guiding component 53 corresponding to the surface 80 is utilized as the base of the optical mouse 50. In this way, the cost of the optical mouse 50 according to the present invention can be significantly reduced and the structure design of the optical mouse 50 can become simpler.

In contrast to the prior art, there are two major advantages and improvements of the present invention. One of the advantages and improvements is that a placement angle of a light-emitting component is adjusted so that a light ray can be directly guided toward a surface of an object, and then re-directed toward a sensor. In this way, repeated reflection and refraction of the light can be avoided and the light ray does not need to pass through many interfaces formed by different mediums, so the intensity of the light ray will not be weakened. The other advantage is that a light-guiding component is utilized for absorbing an undesired light ray (a noise). Hence, a better quality of an image formation of the sensor can be obtained, meaning that the performance of the optical mouse can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image capturing device, comprising:
   a light-emitting component for generating a light ray;
   a light-guiding component for providing a first channel for defining a first straight light-guiding path to guide the light ray generated by the light-emitting component toward a surface and providing a second channel for defining a second straight light-guiding path to guide the light ray reflected by the surface towards a sensor;
   the sensor for sensing the light ray reflected by the surface to detect a movement of the image capturing device on the surface;
   a protecting component, wherein one side of the protecting component is utilized as a lens for adjusting the optical path of the light ray reflected by the surface, wherein the sensor is installed in the protecting component; and
   a diaphragm, installed in the protecting component, for filtering the light ray reflected toward the sensor;
   wherein if the light ray is in the visible spectrum, the protecting component is composed of transparent material(s), and the sensor and the diaphragm are positioned in the transparent material(s); and, if the light ray is not in the visible spectrum, the protecting component is composed of opaque material(s), and the sensor and the diaphragm are positioned in the opaque material(s).

2. The image capturing device of claim 1, wherein the light-emitting component comprises:
   a light emitting diode (LED) chip for generating the light ray generated by the light-emitting component; and
   a lens, installed on the LED chip, for adjusting an optical path of the light ray generated by the light-emitting component.

3. The image capturing device of claim 1, further comprising:
   a conducting support for fixing the light-emitting component and the sensor, and for transmitting power to the light-emitting component and the sensor.

4. The image capturing device of claim 1, wherein the light-guiding component is opaque.

5. The image capturing device of claim 4, further comprising:
- a lens for adjusting the optical path of the light ray reflected by the surface, wherein and the lens is installed in the second channel;
- wherein the second channel starts from the surface to the sensor,
- and the light-emitting component is installed in the first channel.

6. The image capturing device of claim 1, wherein the light ray is an infrared ray (IR).

7. The image capturing device of claim 1, wherein a flat surface of the light-guiding component is further utilized to be a base of the image capturing device, so that the image capturing device is capable of moving on the surface.

8. The image capturing device of claim 1, being an optical pointing device, for detecting its own movement on the surface to generate a pointing signal, wherein the sensor generates a plurality of images corresponding to the surface, and the image capturing device further comprises:
- a control component, coupled to the sensor, for generating the pointing signal according to the images.

9. The image capturing device of claim 8, wherein the optical pointing device is an optical mouse.

10. An image capturing device, comprising:
- a light-emitting component for generating a light ray;
- a light-guiding component for providing a first straight light-guiding path to guide the light ray generated by the light-emitting component toward a surface;
- a sensor for sensing the light ray reflected by the surface to detect a movement of the image capturing device on the surface;
- a protecting component, wherein one side of the protecting component is utilized as a lens for adjusting the optical path of the light ray reflected by the surface, and the sensor is installed in the protecting component; and
- a diaphragm, installed in the protecting component, for filtering the light ray reflected toward the sensor;
- wherein if the light ray is in the visible spectrum, the protecting component is composed of transparent material(s), and the sensor and the diaphragm are positioned in the transparent material(s); and, if the light ray is not in the visible spectrum, the protecting component is composed of opaque material(s), and the sensor and the diaphragm are positioned in the opaque material(s).

11. An image capturing device, comprising:
a light-emitting component for generating a light ray;
a light-guiding component for providing a first straight light-guiding path to guide the light ray generated by the light-emitting component toward a surface;
a sensor for sensing the light ray reflected by the surface to detect a movement of the image capturing device on the surface;
a protecting component;
a lens, installed on the protecting component, for adjusting the optical path of the light ray reflected by the surface; and
a diaphragm, installed in the protecting component, for filtering the light ray reflected toward the sensor;
wherein the sensor is installed in the protecting component; if the light ray is in the visible spectrum, the protecting component is composed of transparent material(s), and the sensor and the diaphragm are positioned in the transparent material(s); and, if the light ray is not in the visible spectrum, the protecting component is composed of opaque material(s), and the sensor and the diaphragm are positioned in the opaque material(s).

* * * * *